May 19, 1964

C. W. BRANDON 3,133,591

METHOD AND APPARATUS FOR FORMING AND/OR
AUGMENTING AN ENERGY WAVE

Filed May 20, 1954

Clarence W. Brandon
INVENTOR.

BY Clarence A. O'Brien
and Harvey B. Jacobson
Attorneys

May 19, 1964  C. W. BRANDON  3,133,591
METHOD AND APPARATUS FOR FORMING AND/OR
AUGMENTING AN ENERGY WAVE
Filed May 20, 1954  8 Sheets-Sheet 2
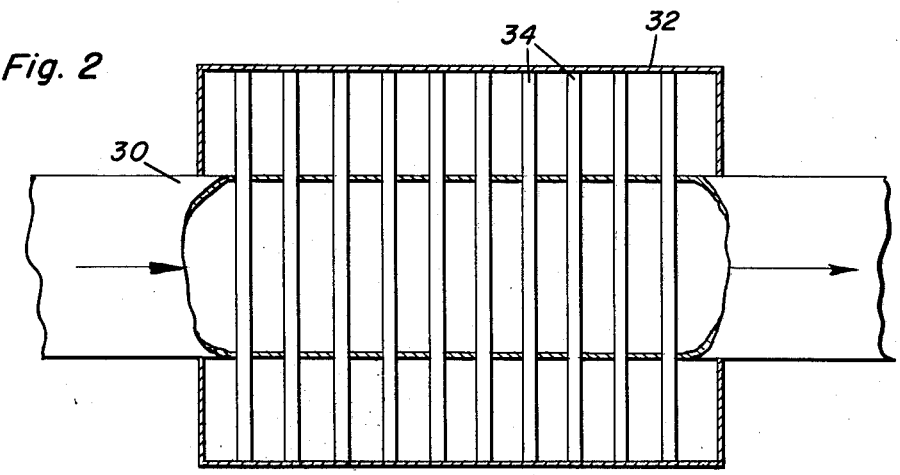
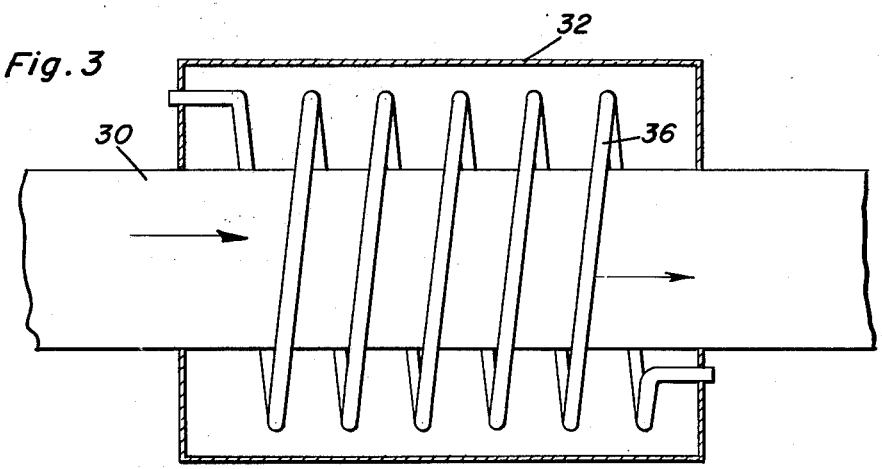
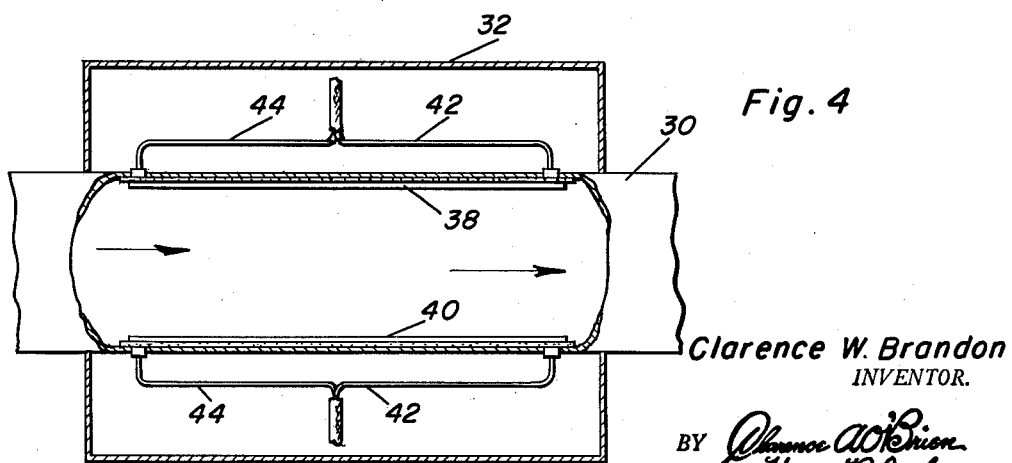
Clarence W. Brandon
INVENTOR.

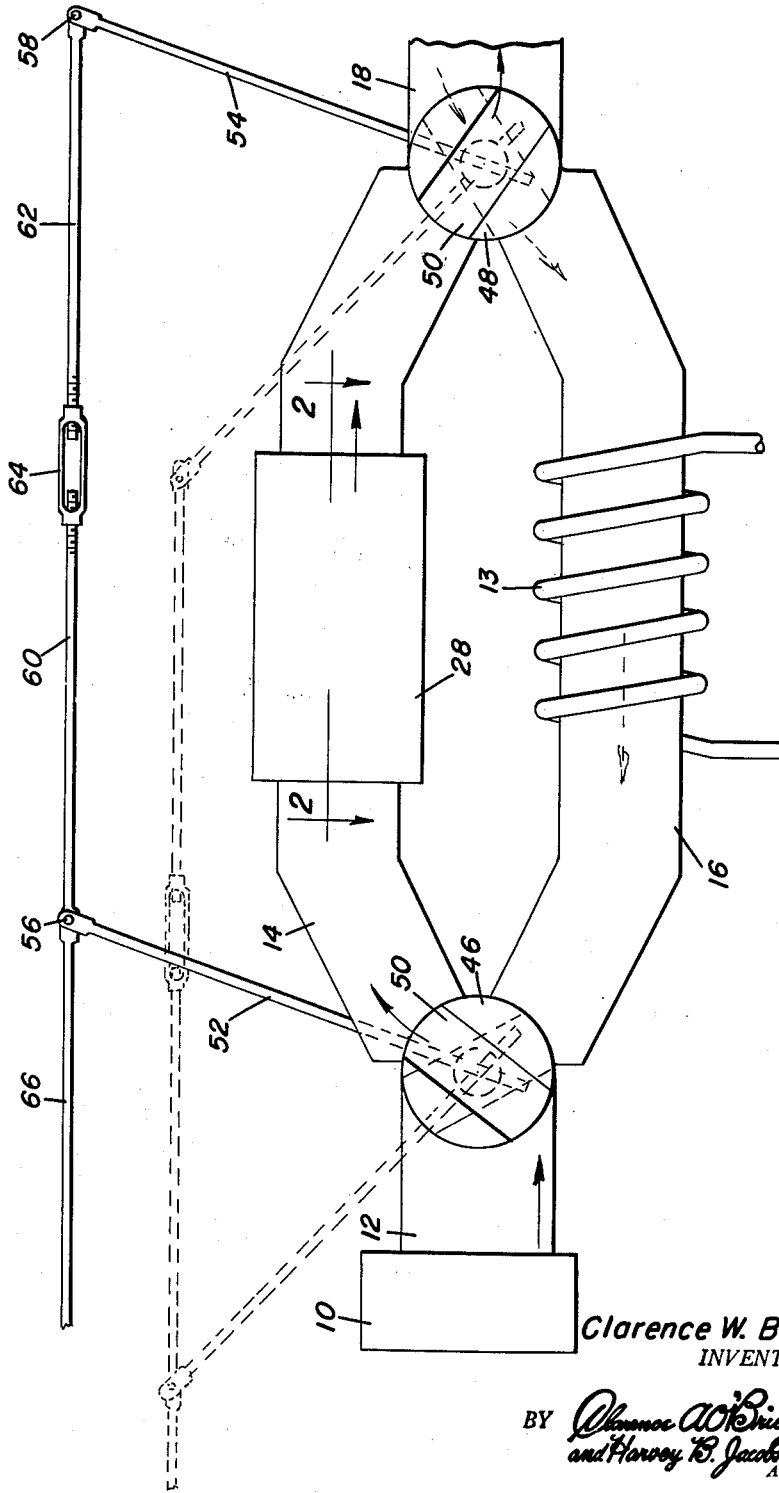

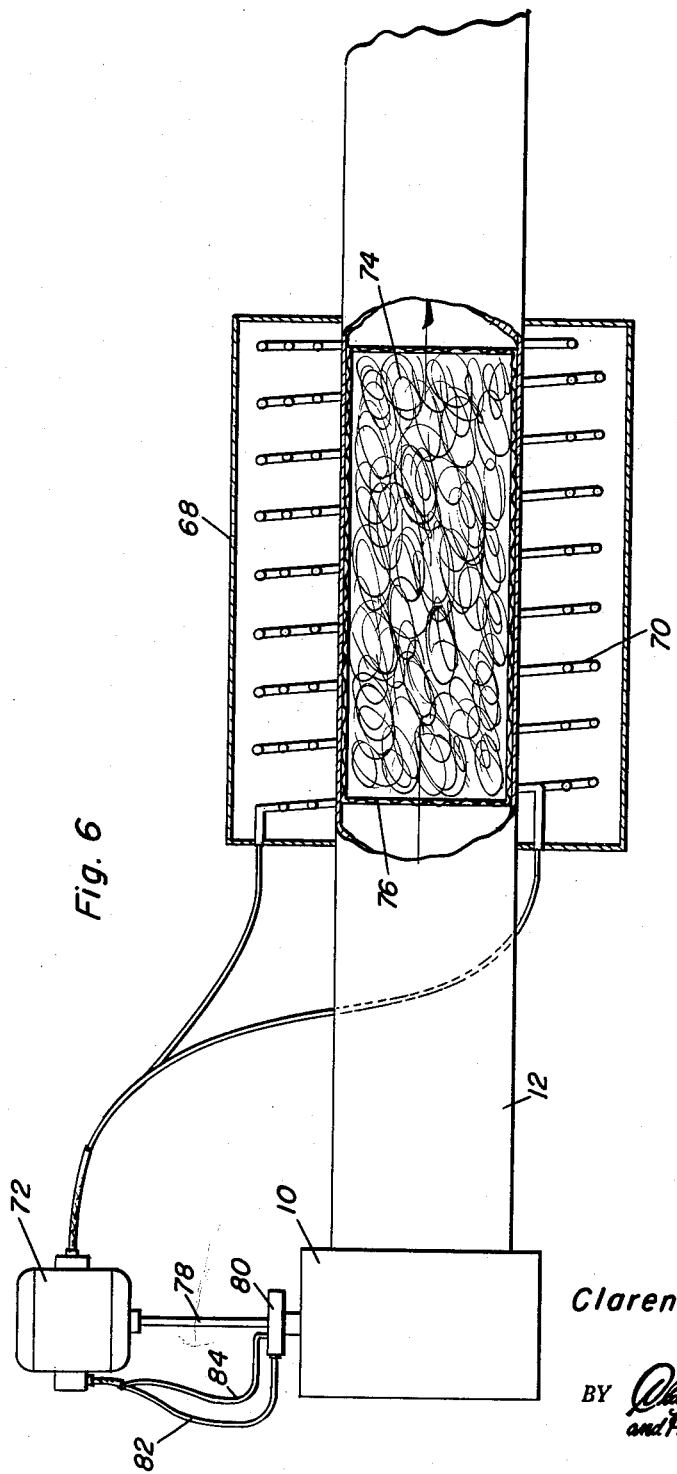

May 19, 1964

C. W. BRANDON 3,133,591

METHOD AND APPARATUS FOR FORMING AND/OR
AUGMENTING AN ENERGY WAVE

Filed May 20, 1954

Clarence W. Brandon
INVENTOR.

BY
Attorneys

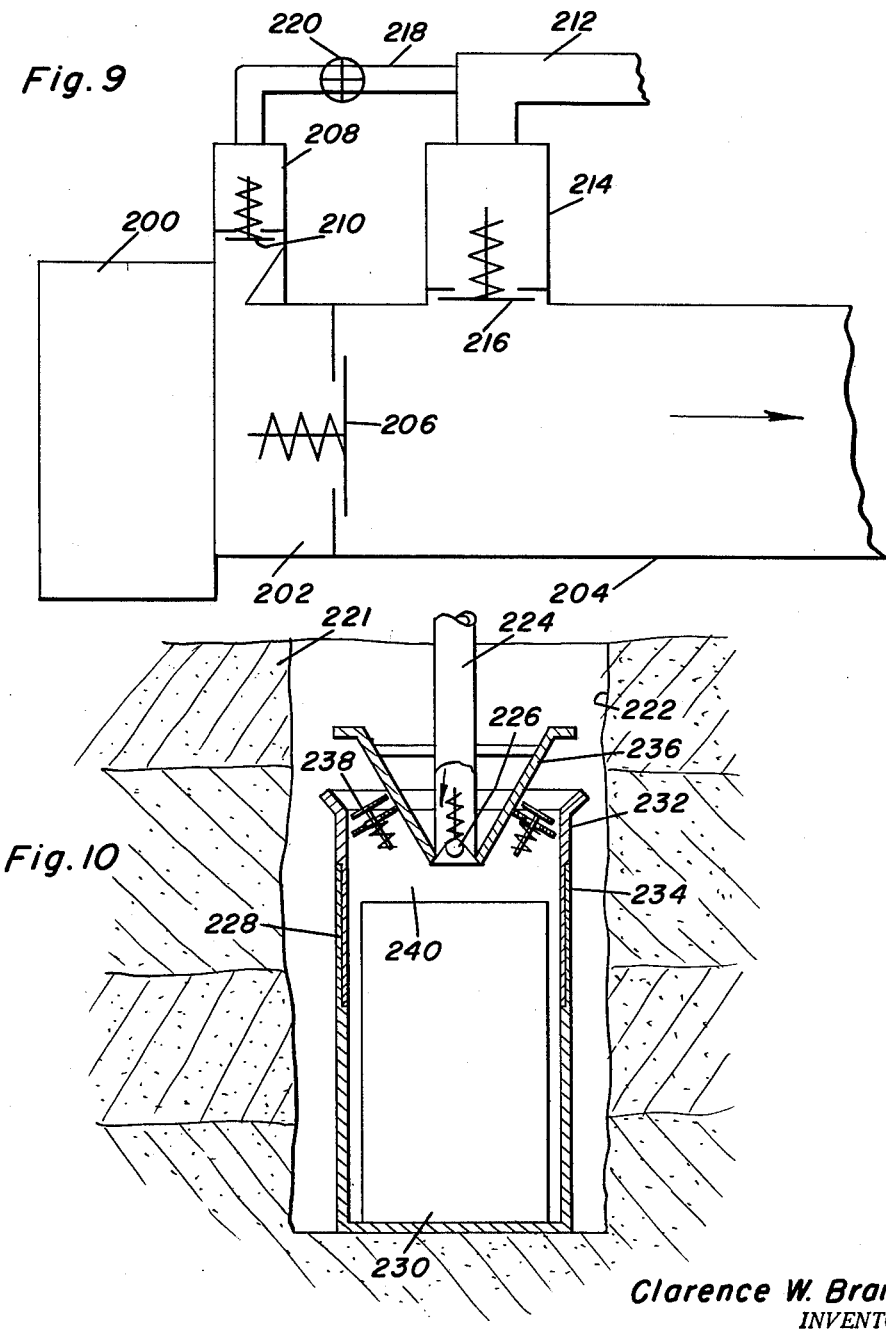

Fig. 16
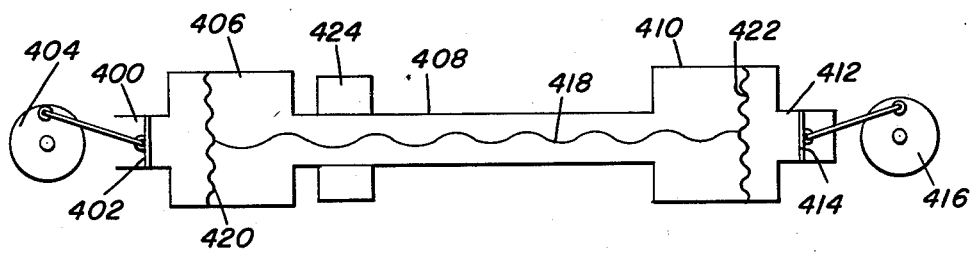
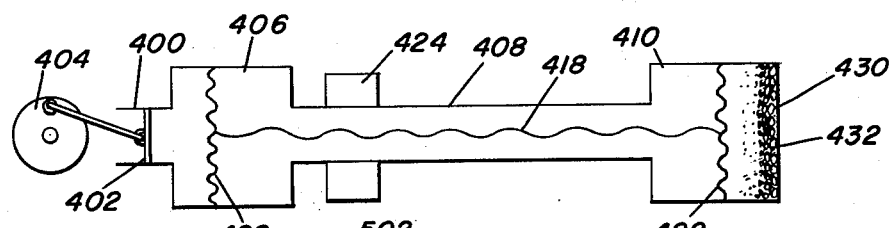
Fig. 17
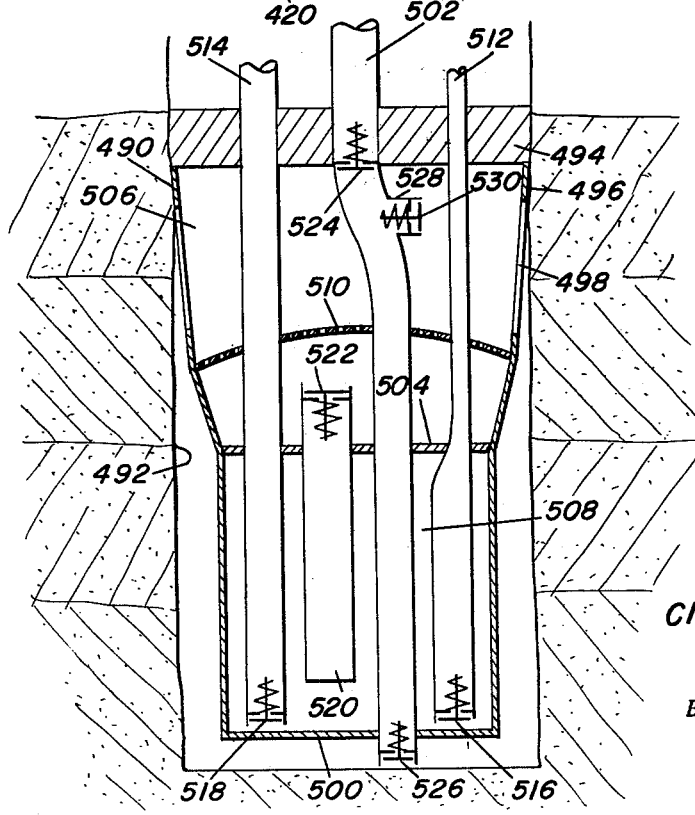
Fig. 11
Clarence W. Brandon
INVENTOR.

May 19, 1964    C. W. BRANDON    3,133,591
METHOD AND APPARATUS FOR FORMING AND/OR
AUGMENTING AN ENERGY WAVE
Filed May 20, 1954    8 Sheets-Sheet 8
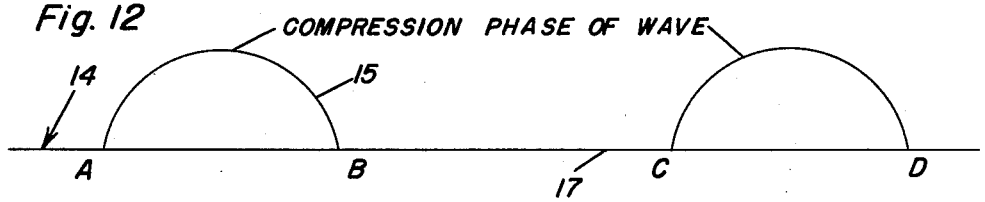
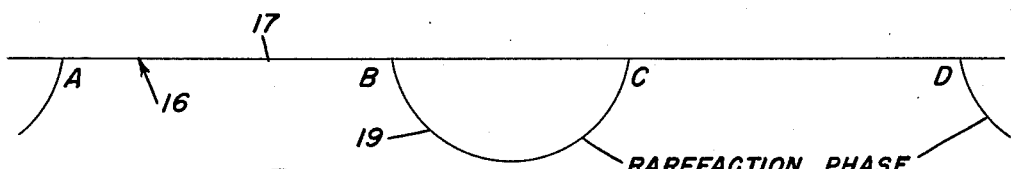
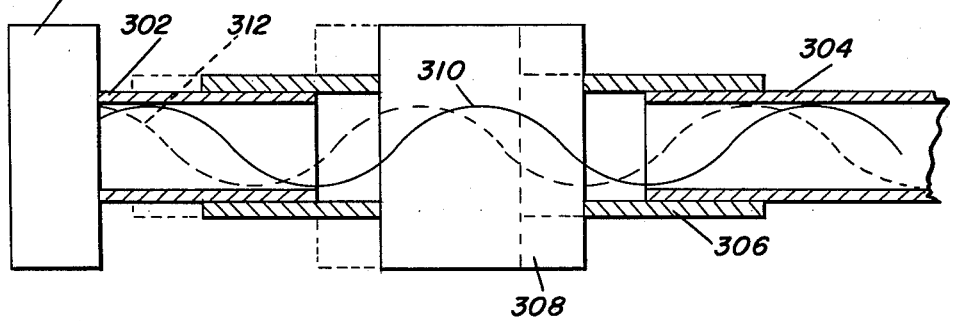
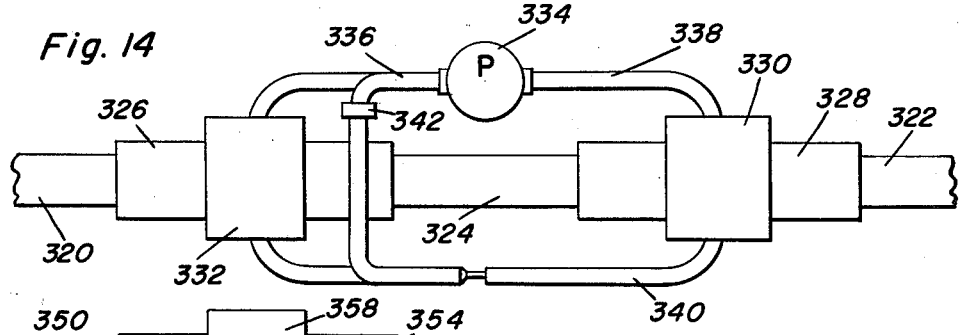
Clarence W. Brandon
INVENTOR.
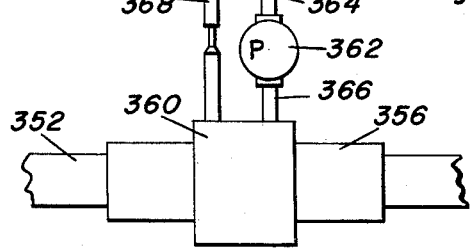

3,133,591
METHOD AND APPARATUS FOR FORMING AND/ OR AUGMENTING AN ENERGY WAVE
Clarence W. Brandon, 1806 Meridian Ave., Tallahassee, Fla., assignor of twelve and one-half percent to Orpha B. Brandon, Birmingham, Ala., five percent to Harvey B. Jacobson, Washington, D.C., and fifty percent to N. A. Hardin, Catherine H. Newton, and Hazel H. Wright, all of Forsyth, Ga., jointly
Filed May 20, 1954, Ser. No. 431,246
9 Claims. (Cl. 166—39)

The present invention relates to methods and apparatuses for forming and/or augmenting an energy wave and more specifically has reference to processes and means whereby heat energy may be directly introduced into a fluid medium or into a pulsating energy wave in a wave propagating medium; or may be abstracted therefrom and converted into heat or mechanical energy.

It is axiomatic, as stated by generally recognized authorities in the study of the wave transmission of energy in a wave propagating medium, that heat applied to an energy carrying wave medium during the compression phase of an energy carrying wave therein, or abstracted during the rarefaction phase, will increase the energy content of the wave by that amount; while the application of heat during the rarefaction phase or its abstraction during the compression phase will decrease the wave energy content to that extent. The present invention is concerned with and based upon this fundamental principle of wave mechanics.

In its broadest aspect therefore, the basic and fundamental purpose of this invention is to provide means and methods whereby energy in the form of sensible heat may be directly introduced into an energy-carrying wave in order to augment or modify the total energy content of the energy wave or to otherwise modify or control its characteristics; and, alternatively, to abstract heat or mechanical energy from an energy-carrying wave.

A corollary object is to apply the foregoing object and principle to the recovery of gases and oils from petroliferous formations.

An important object of this invention is to provide processes and means whereby an energy-carrying wave in a wave propagating medium may be initiated solely by the application of energy in the form of heat to the medium.

A further object of the invention is to provide means and methods whereby an energy-carrying wave in a wave propagating medium may be maintained by replenishing its energy losses or withdrawals through the input of additional energy into the wave in the form of heat applied thereto.

An additional important object of the invention is to provide a means and method in accordance with the preceding objects whereby the energy of heat and the mechanical energy of an energy wave may be readily interchanged and converted.

Still another object of the invention is to provide means and methods whereby the characteristics of an energy-carrying wave in a wave propagating medium may be modified and controlled through the application of additional energy thereto in the form of heat at selected phase angles.

A more specific and corollary object to the immediately preceding object is to provide a means and method whereby to obtain the phase displacement of an energy wave for producing heavier shock effects by the controlled application of heat energy to an energy wave.

Yet another object of the invention is to provide processes and means whereby the energy of electrical impulses, including high frequency electrical alternatives, may be readily converted into heat energy and may then be applied to an energy-carrying wave in a wave propagating medium.

An important, more specific object of this invention is to provide apparatuses and processes whereby heat energy may be introduced into an oil formation to facilitate the recovery of oil therefrom and to control the flow of fluids and gases in the formation by means of energy-bearing waves propagated in the formation.

A further and subordinate object of this invention, in accordance with the preceding objects, is to provide apparatuses and processes whereby liquifiable gases may be introduced into oil-bearing formations for facilitating the heating of the formation through the application of energy-bearing waves therein.

An additional important specific object of the invention is to provide processes and means whereby the dielectric properties of a formation may be utilized for converting the energy content of an energy-carrying wave propagated in the formation into sensible heat released to the formation.

A still further important object of the invention, and in accordance with the immediately preceding object, is to provide apparatuses and processes whereby the dielectric properties of gaseous and/or liquid fluids in an oil bearing formation may be utilized to facilitate converting the energy content of an energy carrying wave propagated in the formation into sensible heat released in the formation.

Another object is to provide apparatuses and methods whereby the compression and rarefaction phases of an energy-carrying wave may be separated or split to permit heat energy to be added to or abstracted from a selected phase to thereby vary and control the energy content and characteristics of a wave.

Still another object resides in the provision of apparatus and methods whereby the energy content of a wave may be selectively varied by the direct application of heat and/or refrigeration to a wave carrying medium at selected phase of an energy-carrying wave therein.

An additional object is to devise apparatuses and methods whereby a constant emission of heat at a substantially uniform rate from a heat source may be continuously and uninterruptedly applied to a fluid medium and continuously introduced into an energy-carrying wave therein for selectively increasing or decreasing the energy content of the wave.

Yet another object of the invention is to provide apparatuses and methods whereby heat energy may be intermittently applied to a fluid medium in a precisely timed phase relative to an energy wave therein whereby to selectively increase or diminish the energy content and/or vary the characteristics of the wave.

A further object is to devise an apparatus and method whereby a constant and uniform flow of heat from a source of heat may be employed to produce pressure impulses for propelling liquid in a conduit.

A still further important purpose of this invention is to devise apparatuses and methods whereby the introduction of heat in to a medium and/or its removal therefrom may be readily effected by an easy positioned adjustment of heat exchange means upon a single conduit relative to the phases of an energy wave therein.

An additional purpose is to provide apparatuses and methods whereby a refrigerating system may be operatively associated with a medium whereby heat energy withdrawn from an energy wave at one phase of its cycle may be restored thereto at another phase in order to vary the energy content of the wave.

And a final important object of the invention to be specifically enumerated herein is to provide apparatuses and methods wherein the application of heat impulses into a medium may be precisely and adjustably timed to the generator of an energy wave therein as to the phase relation of an energy wave.

A further important object is to apply heat and/or refrigeration to an energy wave at an adjustable phase relationship whereby the heat exchange may be caused to lag or precede the phase of the wave to cause a phase displacement or frequency change of the wave; this object being particularly applicable to oil bearing formations for fracturing and applying pulsating fluid pressures thereto.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURES 2–4 are detail views in vertical longitudinal section, taken substantially upon the plane indicated by the section lines 2—2 of FIGURE 1 and FIGURE 5 showing different constructions of heat exchangers and heat generators for introducing heat into an energy-transmitting wave in a wave-propagating medium;

Figure 1:
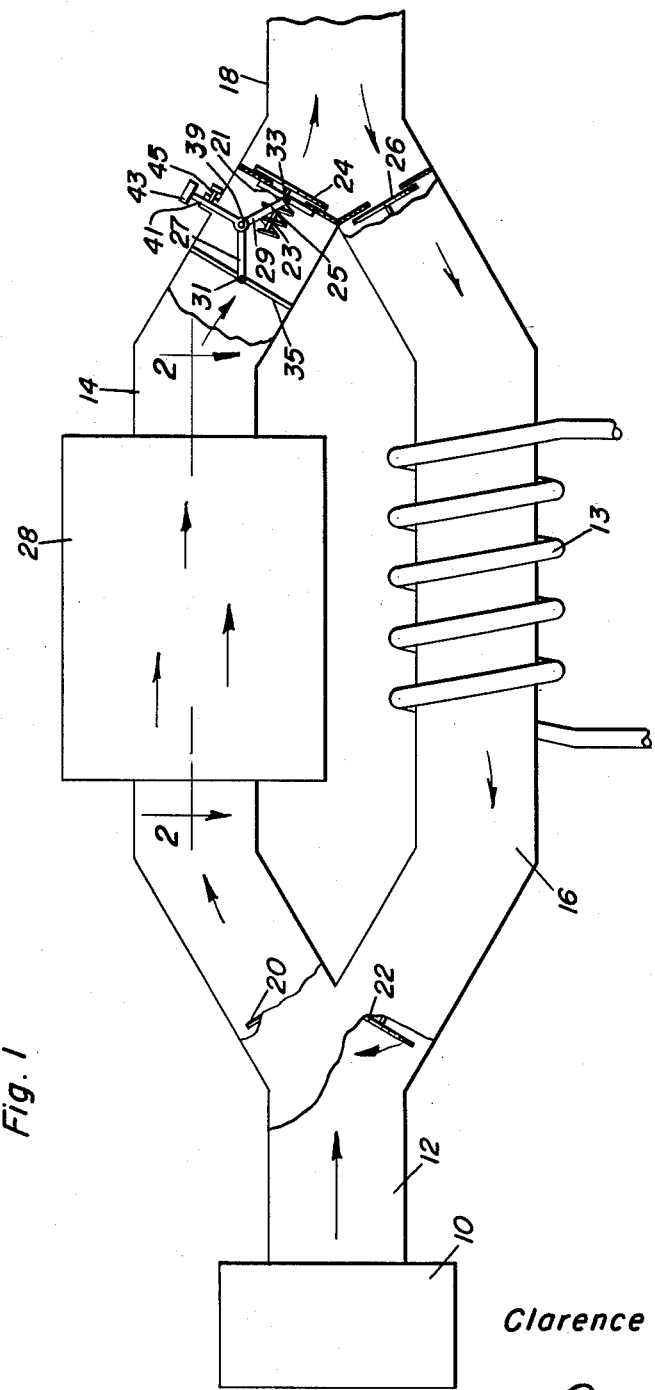
FIGURE 1 is a diagrammatic view showing one manner in which the energy content of an energy wave in a wave transmitting medium may be increased by applying heat to the medium during the compression phase and/or withdrawing heat by refrigeration from the medium during the rarefaction phase of the wave.
Figure 7:
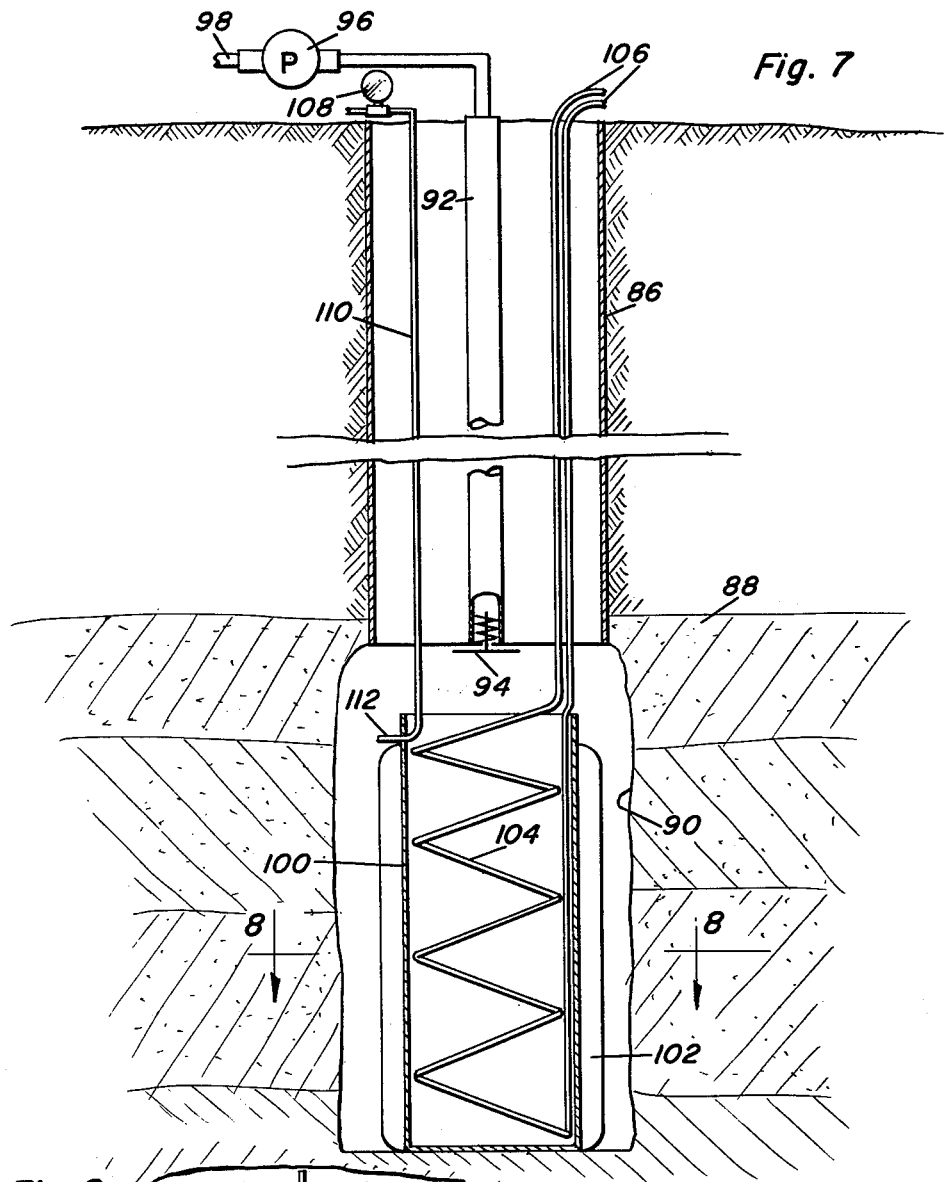
Figure 8:
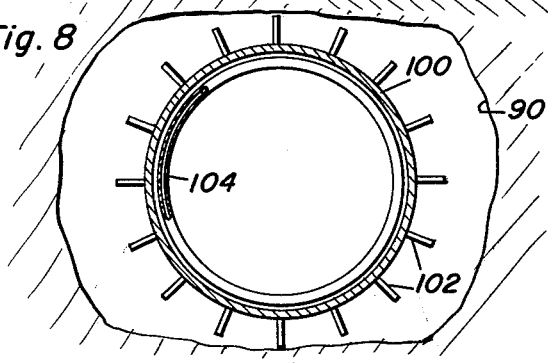

FIGURE 5 is a view similar to FIGURE 1 but showing a modified construction by which the sensible heat energy is introduced into the energy-carrying wave of a wave-transmitting medium at an adjustable and predetermined phase of the energy-carrying wave, one position of the adjusting means being shown in full lines and an alternative position being shown in dotted lines therein, the timing with respect to the phase relation being effected positively in a mechanical manner;

FIGURE 6 is a diagrammatic view showing partly in elevation and partly in longitudinal section an apparatus whereby electrical heat energy may be intermittently transmitted by induction heating to a wave-transmitting medium to which an energy-carrying wave has been applied by a wave generator, and wherein precise and adjustable timing of the phase relationships of the introduction of heat energy with respect to the energy-carrying wave is effected;

FIGURE 7 is a diagrammatic view in vertical section of a portion of an oil-bearing formation and to which has been operatively connected an energy wave generating means wherein the wave is initiated and/or maintained by the input of sensible heat energy and either with or without the application of a uniform or a pulsating liquid pressure drive to the formation;

FIGURE 8 is a horizontal sectional detail view taken substantially upon the plane indicated by the section line 8—8 of FIGURE 7;

FIGURE 9 is a diagrammatic view showing another application of the principles of this invention and illustrating in particular a portion of a liquid conducting conduit together with a device whereby sensible heat from a continuous source of heat is intermittently applied to the liquid in the conduit for initiating, augmenting and/or maintaining an energy-transmitting wave therein; and/or for applying a propulsive force to such liquid;

FIGURE 10 is a diagrammatic view in vertical section through a portion of an oil-bearing formation and showing the manner in which heat energy from a continuous heat source is intermittently applied to the fluids of a formation for initiating, augmenting and/or maintaining an energy-transmitting wave therein; for heating the formation; and for applying pressure to the formation fluid;

FIGURE 11 is a further modification in vertical sectional view through a portion of a well bore showing a combustion form of heater disposed therein and which is adapted to introduce carbon dioxide gas into the fluid medium for treating a formation;

FIGURE 12 is a diagrammatic view illustrating the operation of the embodiment of FIGURE 1;

FIGURE 13 is a view partly in elevation and partly in section illustrating an embodiment wherein the location of the heat input into a medium relative to the phase of an energy carrying wave therein may be readily adjusted, alternative positions of adjustment being shown in full and dotted lines;

FIGURE 14 is an elevational view, somewhat diagrammatic, of another embodiment wherein heat and refrigeration may be applied to a medium during the compression and rarefaction phase of a wave therein, the apparatus being somewhat similar to that of FIGURE 13;

FIGURE 15 is a diagrammatic view of still another embodiment combining the principles of FIGURES 1 and 2 with those of FIGURE 14 and wherein heat and/or refrigeration are applied to a medium during the compression and rarefaction phases respectively of an energy carrying wave therein; and FIGURES 16 and 17 are diagrammatic views respectively illustrating the manner in which an energy-wave having heat energy added thereto, may be utilized to release energy in mechanical work or in heat respectively.

In my prior co-pending applications, now matured into Patent No. 2,796,129 and Patent No. 2,866,509, there are disclosed and claimed processes and apparatuses for producing energy-bearing waves having predetermined characteristics in an energy-transmitting medium and for varying and controlling those characteristics; and especially for treating oil-bearing formations by such waves to facilitate the recovery of oil therefrom. Broadly disclosed in those applications are processes and apparatuses whereby the energy of the generated waves may be increased, controlled or modified by the application of sensible heat thereto.

The present application constitutes an improvement over these prior applications in that it discloses and claims specific processes and apparatuses for the converting of heat energy into wave energy and for utilizing the latter; for initiating and/or maintaining an energy-carrying wave through the controlled application of heat impulses thereto; and for modifying and controlling the characteristics and action of such energy-carrying waves by controlling the generation and the application of heat impulses thereto.

*Embodiment of FIGURES 1 and 12*

An apparatus and method is diagrammatically disclosed in FIGURES 1 and 12 by means of which the energy content of an energy wave in a wave propagating medium may be maintained or may be controllably altered by the application of heat to the medium from a constant source of heat and/or by the withdrawal of heat from the medium by means of a constant source of refrigeration. This apparatus and method is effective to augment or diminish the energy content of an energy wave; to modify or control the characteristic of such a wave; to maintain a constant energy content of a wave despite inputs or withdrawals of energy therefrom; or in some instances to initiate an energy carrying wave in a wave propagating medium.

Illustrated in FIGURE 1 is a generator 10 which may be of any type capable of generating an energy wave in a wave propagating machine, and which may satisfactorily be of the types disclosed or claimed in my prior patents mentioned above.

Acousticably or operatively connected to the wave generator 10 is a conduit 12 having a pair of branch conduits 14 and 16 disposed in parallel relation, the branch conduits in turn communicating with a further conduit 18 constituting a continuation of the conduit 12. This arrangement provides parallel or branch conduits which are directly connected with the energy wave generator 10. An energy wave propagating medium of any desired type, such as water, oil or the like, fills the conduits 12, 14, 16 and 18.

At the junction of the conduits 14 and 16 with the conduit 12, there are provided non-return check valves 20 and 22, respectively, the former opening inwardly into the branch conduit 14, while the latter opens outwardly from branch conduit 16 into the conduit 12. At the opposite ends of the branch conduit, there are provided similar non-return check valves 24 and 26, the former opening in a direction to permit flow from the branch conduit 14 into the conduit 18, while the latter opens in a direction to permit flow from the conduit 18 into the branch conduit 16. These valves are preferably spring closed at any desired and/or at a regulatable tension in any conventional manner.

In order to adjustably vary the spring closing pressure on the check valves, any suitable device, such as that of FIGURE 1 may be employed. For the sake of simplicity of illustration, the adjusting means is illustrated only in connection with the valve 24, although it is understood that it may and usually will be applied to each of the other check valves.

The spring pressure adjusting device comprises a spring abutment plate 21 slidably received on the valve stem 23 and supporting an end of the spring 25 whose other end is fixed to the valve stem. A pair of toggle links 27 and 29 are pivoted at 31 and 33 to an anchor rod 35 suitably mounted in the conduit and to the abutment plate. At the hinge pin 39 of the toggle, a control rod 41 is pivoted, the latter extending through the wall of the conduit and having a control knob 43. Locking of the control rod in adjusted position is secured by the set screw arrangement 45.

Movement of the toggle hinge by the control rod will shift the abutment plate and thus secure a variable adjustment of the valve spring and of the closing pressure of the check valve.

Indicated diagrammatically at 28 is a heat exchange device which is disposed in direct heat exchange relation with the branch conduit 14. The exchanger is of any desired character, and may conveniently comprise any of the various embodiments referred to hereafter, whether of a continuous or of a variable rate of heat generation and/or emission; and whether of continuous or of an intermittent or periodically interrupted rate of heat flow. In particular, this form of the invention may be of a continuously generating and constant rate of heat emission type as in FIGURES 2–4.

A heat removing or refrigerating device, is indicated at 13, which may take the form of a coil surrounding and/or in direct heat exchange relation with the other branch conduit 16. The coil forms part of any conventional refrigerating device, not shown, and comprises a means for withdrawing heat from the medium in the conduit 16. Although the cooling device 13 may be of a type to continuously remove heat, either at a constant or variable rate, or with a continuous or intermittently interrupted flow, it is particularly adapted for the same type of operation as the heating device 28.

It is believed that the method of operation of this embodiment of the invention is as follows, reference being made both to FIGURES 1 and 12, it being assumed that the device is arranged and intended to increase the energy content of a wave, although it may in some instances be arranged to decrease the energy content as set forth hereinafter.

When the energy-carrying wave produced in the conduit 12 by the generator 10 reaches the check valves 20 and 22, the compression phase of this wave opens the check valve 20, and thus subjects the medium in the branch conduit 14 to the compression phase of the wave. This compression phase travels through the conduit 14 at the speed at which the wave is propagated in the particular medium with which the conduits are filled, the curve 15 representing the pressures produced in the medium by the compression phase of the wave, and emerges through check valve 24 into the conduit 18. When the compression phase, however, hits the check valve 22, it is unable to open the same, and therefore does not pass into the branch conduit 16.

When the rarefaction phase, which follows the compression phase of the wave reaches the branch conduits, the check valves 20 and 24 close or remain closed; while the check valves 22 and 26 open in their turn and permit the rarefaction phase to pass through the conduit 18, the curve 19 representing the pressures produced in the medium by the passage of the wave through the branch conduit 16. The arrows in FIGURE 1 diagrammatically indicate the direction of the wave travel in the branch conduits.

The line 17 in FIGURE 12 represents the normal pressure in the medium of the two branch conduits, that is, the pressures prevailing between the peak pressures, whether compression or rarefaction. Although this has not been definitely established, it is believed that the pressures of each conduit is substantially uniform; and that they are substantially equal or at least at a constant relation or proportion in the two conduits. In any event, there is a periodic rise in pressure 15 above the normal 17, in the conduit 14 between the points A and B and again between C and D, these rises constituting the compression peaks or compression phases of the wave; while corresponding succeeding drops in pressure 19 below the normal 17 occurs in the branch conduit 16 between the points B and C.

The divided and separated compression and rarefaction phases of the energy wave, separated in the branch conduits to permit the addition thereto or the removal therefrom of energy, are recombined at the valves 24 and 26 and the reconstituted split phases of the restored energy wave is then transmitted by the conduit 18 to its target or receiver.

It will probably be found desirable to form the branch conduits 14 and 16 of the same length as the wave being propagated by the generator 10; or equal to an integer multiple of the same and to originate the compression phase portion 15 or the rarefaction phase portion 19 of the wave at the valves 20 or 22. In any event, in the arrangement illustrated it is apparent that the compression phase portion of the wave, representing a higher wave pressure is maintained in the conduit 14 by the generator 10 than the rarefaction phase portion of the wave representing a lower wave pressure which is maintained in the conduit 16. Consequently, heat from the heat exchanger 28 introduced into the medium within the conduit 14 is directly introduced into the energy carrying wave itself since the latter is present only in its compression phase. Thus, the heat input from the exchanger 28 is directly introduced into the energy-carrying wave and serves to augment the energy content of the same; or to maintain the energy content at a desired level; or to modify or control the characteristics of the energy-carrying wave.

In a similar manner, heat is withdrawn from the medium by the cooling device 13 during the rarefaction phase of the wave, also increasing the energy content of the wave.

It will be now apparent that the operation of either of the heat exchange devices 28, 13, alone, will increase the energy content of the energy wave and that both of the devices 28, 13 may be simultaneously operated to obtain the maximum rate of energy increase in the wave energy content.

In the arrangement of FIGURE 1, it is possible for the wave transmitting medium itself to travel in the conduits. Thus, where the embodiment is employed in conjunction with a water drive for pressurizing an oil or gas bearing formation for recovering oil or gas from the same, the pressurizing fluid may travel from the conduit 12 through the conduit 14 and the conduit 18 to its destination. In such an arrangement it is possible to utilize the fluid medium in its pressurizing operation while imparting thereon an energy-carrying wave from the wave generator 10 and for introducing heat into the wave by the heat exchanger 28 and/or the cooler 13.

In this form of the invention, the characteristics of the branch conduits 14 and 16 are so chosen as to maintain the energy-carrying wave in its compression phase in the branch conduit 14 and in its rarefaction phase in the branch conduit 16. This condition may be brought about by properly determining the relative lengths of the branch conduits; their shapes; the mean or standing pressure of the mediums therein; and by controlling the frequency of the wave generator 10. In any event, it will be evident that when these proportions and characteristics are so determined and attained, the compression phase of the wave will be maintained more or less continuously in the branch conduit 14, and thus will permit the continuous introduction of heat energy from a heat exchanger 28 directly thereinto. Similarly, heat energy may be extracted by the cooler 13 from the rarefaction phase which is maintained more or less continuously in the branch conduit 16.

As aforesaid, an introduction of heat energy into the wave-carrying medium of the conduit 14 may be effected in a large variety of ways. When the wave therein is in its compression phase, any continuous source of heat will be effective to introduce energy into the wave. Shown in FIGURES 2-4 are different manners in which this heat exchange may be effectuated.

Thus, in FIGURE 2, there is disclosed a conduit portion 30 which may be an intermediate portion of the branch conduit 14 shown in FIGURE 1. A heat exchanger 32, which may be the heat exchanger diagrammatically and generically indicated 28 in FIGURE 1, is shown as comprising preferably a cylindrical drum enclosing and/or in heat exchange relation with the conduit portion 30. A plurality of tubes 34 extend through the drum 32 and also through the conduit portion 30. A source of heat is applied to the interior of these tubes in any desired manner, as, for example, by passing combustion products or other heated fluid medium therethrough, and the tubes 34, in turn, directly conduct and transmit their heat energy into the medium passing through the conduit portion 30, and which thus surrounds the tubes. In this form of the invention, therefore, heat as energy is directly introduced into and heats the wave propagating medium on the compression phase of the latter and the conduit portion 30 by direct heat exchange or conduction.

In the modified construction of FIGURE 3, the conduit portion 30 is likewise surrounded by the heat exchanger's cylindrical drum-like casing 32. However, an electrical heating coil 36 is disposed in the casing 32 and surrounds the conduit portion 30, this heating coil being supplied by electrical energy from any desired source, not shown. If desired, the casing 32 may be filled with a liquid or other heat conducting medium to facilitate transfer of the energy from the coil 36 to this adjacent surrounded portion of the conduit 30 for heating the same. The coil 36 may thus function as conventional electric conductive type of heater; or may be of an inductive type for inducing through a high frequency electric current heat energy in the surface of the conduit 30 from whence the heat energy is discharged by conduction into the wave-carrying medium within the conduit.

A still further method of heat exchange is disclosed in FIGURE 4, wherein the conduit portion 30 is surrounded by the cylindrical drum-like casing 32. In this arrangement, however, dielectric heating is effected. For that purpose, a pair of electrodes 38 and 40 are insulatingly mounted within the interior of the conduit portion 30 and have their opposite extremities connected to electric conductors 42 and 44 which in turn form part of an electrical circuit, not shown. Any desired number of these electrodes or resistance elements may be provided. In this arrangement, the flow of current passing through the high resistance of the dielectric material 38 is converted into heat which in turn is given by conduction into the medium within the conduit portion 30.

It will also be understood that in some instances the electrodes 38 and 40 may be connected to the opposite sides of the electrical circuit whereby the fluid itself in the conduit passing between the electrodes constitutes the dielectric material to be heated by the flow of current.

In the form of the invention shown in FIGURE 1, therefore, it is evident that a continuous source of heat may be utilized to introduce heat energy into the energy content of an energy-carrying wave, by means of heat exchange with the wave-propagating medium at a portion which is continuously at the compression phase of the wave.

In the operation as above set forth, it has been assumed that the apparatus and method are functioning to add energy into the wave. However, by reversing the arrangement, energy may be withdrawn from the wave. Thus, by placing the heating and cooling devices, either alone or together, upon the rarefaction and compression conduits 16 and 14, respectively, the devices will each decrease the wave's energy content.

This embodiment of the invention may thus function as a means for receiving energy from an energy wave; and the entire assembly, by virtue of this reversibility of operation, is inherently ideally adapted to perform as a heater or cooler for air conditioning or other purposes.

Embodiment of FIGURE 5

FIGURE 5 is very similar to the arrangement of FIGURE 1 in that the wave generator 10 is connected to a conduit 12 which in turn is in controlled communication with compression phase and rarefaction phase branch conduits 14 and 16 having communication with a further conduit 18 forming a continuation of the conduit 12. Also as in the preceding embodiment, the heat exchanger 28 and/or the cooling devices 13, which may be of the various characters previously described or of the types set forth hereinafter in the specification, are provided.

However, instead of employing adjustable self-closing one-way check valves to control the communication between the branch conduits 14 and 16 and the conduit sections 12 and 18, there are provided a pair of controllable, positively actuated two-way control valves 46 and 48 which for ease of illustration are shown as of the rotating or oscillating types. Each of these valves is preferably provided with a diametrically disposed passage or port 50 which, upon pivoting of the valve, will alternately place the conduit sections 12 and 18 in communication with the compression phase branch conduit 14 and with the rarefaction phase branch conduit 16.

Actuating levers 52 and 54 are operatively connected with the valves 46 and 48 for pivoting them between their two alternative full and dotted line positions as shown in FIGURE 5. By means of pivotal connections 56 and 58 upon the levers 52 and 54 respectively, the valve levers are interlinked and an adjustable link consisting of a pair of sections 60 and 62 is provided with an adjusting member such as the turnbuckle 64. By adjusting the over-all length of the links 60, 62 the phase relationship between the two valves 46 and 48 may be varied. A control rod 66 is connected to the valve lever 52, at the pivot 56, and in turn is operatively connected with the operating means of the wave generator 10, not shown, whereby the pivoting of the valves may be timed to the operation of the generator 10 and thus to the phase of the energy wave produced by the latter.

In this way, the valves can be so adjusted that the branch conduit 14 will be placed in communication with the conduit 12 only when the generator, and consequently the energy-carrying wave produced thereby, is on its compression phase, while the valves will place the rarefaction branch conduit 16 in communication with the conduit sections 12 and 18 only when the generator is on its rarefaction phase.

It will thus be apparent that by means of the valves and connecting linkage for the same the branch conduit 14 is maintained upon the compression phase of the wave while the conduit 16 is maintained upon the rarefaction phase of the same or at any desired phase angle relative thereto, either continuously or periodically varying all at different frequencies from that of the wave. The heat from the heat exchanger 28 and/or the cooling device 13 will therefore be placed in operative heat-exchange relation with the wave-propagating medium, with certainty and preciseness at a time when the energy wave is upon its appropriate phase, and therefore the addition of heat energy to the wave or the withdrawal of the same therefrom will be effected.

It will further be evident that the adjusting means 64 permits a precise adjustment and timing of the valves 46 and 48 with respect to each other. The embodiment of FIGURE 5 is therefore characterized by a positive but adjustable mechanical timing of the application of the energy-carrying wave from the wave generator 10 to the branch conduits 14 and 16.

It is also possible in this embodiment to separately time and actuate each of the valves 46 and 48 by means of the actuating levers 52 and 54 and the rods 60 and 62 by connecting the latter two rods to different timing and actuating mechanisms. Since the principles of such operation are believed to be obvious, a detailed explanation is deemed to be unnecessary.

As in the embodiment of FIGURE 1, energy may be withdrawn from the wave, this embodiment affording all of the operations set forth in connection with FIGURE 1.

Embodiment of FIGURE 6

In FIGURE 6 there is disclosed a different manner of applying the principles of this invention whereby the necessary timed application of the input of heat energy to the compression phase of the energy-carrying wave in the wave-propagating medium is attained without separating the wave phases, but by synchronizing or matching an intermittent or periodic input of heat with the intermittent or periodic compression phases of an energy wave by synchronizing the drive of the wave generator and of the heat producing means; or by varying the phase angle of the application of the heat to the wave.

Thus, as in the preceding embodiments, the mechanical wave generator 10, of any of the various types previously referred to such as that of my prior Patent 2,866,509, is in direct communication with the conduit 12. By means of the generator 10, an energy-carrying wave is produced in the conduit 12 which travels in the direction indicated by the arrows, producing alternate compression and rarefaction phases in a manner well understood. Surrounding a portion of the conduit 12 is the casing 68 of a heat exchanger or heat input device. Disposed within this casing is an induction coil 70 which surrounds the conduit 12. The coil in turn is energized by an alternating current electrical generator 72 of any suitable character whereby, upon operation of the generator 72, the coil 70 will be energized at a frequency corresponding to that of the rotation of the generator 72. Disposed within the conduit 12 is a mass of highly resistant electrically conductive material 74 such as metallic wool or fiber, or any other desired substance, which is retained in place as by a foraminous screen cylindrical enclosure 76.

The generator 72 energizes the induction coil 70 which in turn causes heating of the material 74. Since the electric energy from the generator 72 consists of a series of electric impulses the coil 70 will produce heat impulses at the same rate in the material 72.

In order to correlate the timing of the inductive high frequency heat impulses imparted to the material 74 by the coil 70 when energized by the generator 72, a common drive shaft 78 is provided connecting the electrical generator 72 with the wave generator 10 for operating them at the same speed, and therefore either at the same frequency or at an integer multiple thereof. An adjustable electric switch 80 of a rotary type may be provided which is rotated by the mechanical wave generator 10 at the same frequency or at an integer multiple thereof, and through electric cables 82 and 84 controls the cycle of the electric generator 72. By adjusting the switch 80, the phase relationship between the generators 10 and 72 and the time at which heat impulses are generated or induced in the material 74 may be precisely adjusted, and thus correlated with the compression phase or the rarefaction phase of the wave mechanically produced by the wave generator 10 in order to introduce the heat energy into or remove the same from the energy content of the wave.

In this form of the invention, intermittently produced electrically generated heat impulses are applied to the wave-carrying medium only during the compression phase of the energy-carrying wave propagated by the medium in order to augment the energy content of the wave.

It will, of course, be evident that the induction type of heater 68, 70 of FIGURE 6 may be replaced by the heaters of FIGURES 3 and 4; and may in turn be utilized in place of the heaters 3 and 4 in the embodiments as previously described.

This apparatus may also be used for initiating an energy-carrying wave in a wave propagating medium. For this purpose the wave generator 10 is omitted and the electrical generator is operated in any desired manner to obtain the desired frequency. As the coil 70 is energized periodically, heat is intermittently produced and delivered to the medium by the element 74. Each heating of the latter causes a heating and expansion of the adjacent layer of the wave propagating medium. The sequences of periodic expansions thus create a series of compressions in the medium, this resulting in a compression wave having successive compression and rarefaction phases and constituting an energy carrying wave.

The frequency and amplitude of this wave is of course determined and controlled by the excitation of the member 74 in response to regulation of the generator 72.

It will be further evident that by timing the electrical and heat impulses to occur during the rarefaction phase of the energy wave, the energy content of the wave may be accordingly reduced, if desired.

By a suitable use of devices of this character, the energy content of a wave may be maintained at a desired level or may be increased or reduced as desired; and the phase of an energy wave in a medium may be displaced by imparting a lag or an advance thereto to produce a hammer effect.

Embodiment of FIGURES 7 and 8

FIGURES 7 and 8 disclose a somewhat different method and apparatus for carrying out the principles of this invention. Shown at 86 is a well casing or bore extending into an oil-bearing or other formation 88 and wherein the bore has been enlarged in any of the known manners to provide a chamber 90. A conduit 92 extends through the casing from the surface of the ground into the chamber 90, being provided with a non-return check valve 94 at its lower end. By means of a pump 96 of any desired character, a pressure medium such as water or the like is introduced from a supply conduit 98 from any suitable source into the conduit 92, where the same is applied against the face of the formation in the chamber 90 to constitute a pressure drive which may be of a conventional and known type, and which is commonly employed in secondary recovery operations.

Alternatively, or in addition to its function as a pressure drive, the pressure medium may be utilized for disrupting, or otherwise treating the formation as set forth in my prior patents mentioned above. A metallic cylindrical housing 100 is disposed in chamber 90 and preferably upon the bottom wall of the same, this housing being open, if desired, at its upper end, as shown. The housing is preferably of a material having a good heat conductivity; and/or is provided with a plurality of heat radiating fins or ribs 102 for the purpose of increasing the heat conductivity of the housing with respect to the pressure medium in the chamber 90.

A heating element 104, which may be of any desired character and which as illustrated in FIGURE 7 may conveniently consist of an electric heating coil, is disposed in the casing 100, the electric conductors 106 for supplying current to this coil extending up the well casing 86 to the surface and being connected to any suitable source of electric power. Conveniently, a pressure gauge 108 is positioned upon the surface of the ground and is connected as by a conduit or line 110 with the interior of the chamber 90 as by its extremity 112.

The apparatus disclosed in FIGURE 7 possesses a number of functions. It is inherently capable of use as a heating element whereby heat from an electric source may be directly applied to the pressure drive fluid and/or to the formation for heat treating the same in known manners and for known purposes.

More particularly, however, the heater 100 is utilized for the same purposes as the preceding embodiments, namely, to apply heat energy into an energy carrying wave. To this end, the pump 96 is operated as a generator of energy carrying waves; or an energy wave generator of any desired type, such as those referred to in my above mentioned prior patents, is accoustically coupled to the conduits 98 and/or 92 for producing an energy carrying wave therein.

Upon the compression phases of this wave, which may be determined from the gauge 108, electrical energy is applied to the heating coil 104 in synchronized or properly timed relation whereby the heat energy produced by the conversion of the electrical energy in the coil 104 will be radiated in heat impulses by means of the fins 102 of the heater casing 100 into the pressure medium for the purposes of increasing the energy content thereof, maintaining or restoring its energy content or for modifying the characteristics of the energy wave.

The timing of the heat impulses of the heater 100 may, of course, be controlled by properly timing the electrical impulses applied to the coil 104, this latter timing being effected by any of the methods or means set forth hereinbefore and may be coordinated with the wave generator of the energy carrying wave in any of the manners and means disclosed herein.

It will be understood that the means for converting the electrical energy into heat energy in the casing 100 may be varied in nature. Thus, instead of the conventional heating coil, the element 100 may consist of an induction heater which may, for example, be of the type disclosed in FIGURE 6; may be a dielectric heater or an arc heater as disclosed in FIGURE 4, or may be of any type set forth in this application.

The apparatus disclosed in FIGURE 7 may also be utilized without the use of the energy bearing wave generating means previously mentioned in connection with this figure, as a means for initiating and maintaining an energy bearing wave of any desired character.

Thus, when the electrical energy is intermittently and rhythmically applied to the conductors 106, there will be a rhythmic and intermittent energization of the coil 104, and consequently, an intermittent heating and cooling of the heater casing 100. As the latter is intensely and quickly heated and cooled, the medium adjacent the same will be highly heated and even flashed into its gas or vapor phase, and the resultant expansive pressure of the highly heated contacting liquid will produce a compression wave radiating from the heater. By properly timing the frequency of the electrical pulsations, an energy carrying wave of predetermined and controlled characteristics will be set up.

It will be observed that the intensity of the heat generated in the member 100 will in turn control the strength of the energy waves generated thereby in the surrounding medium. It is believed that the intense pulsating heat of the casing 100 and its fins 102 will vaporize the adjacent layer of molecules of the surrounding medium, producing a shock or compression wave radiating from the casing 100. Each successive heating impulse will, in turn, produce another shock or compression wave. The frequency of the shock wave will of course be the time between the successive heating impulses emitted by the casing 100, while the wave length will be the distance measured radially from the casing 100, between successive compression phases of the shock wave produced in the medium.

It is to be noted that in some instances the check valve 94 may be omitted from the conduit 92 and the pulsations produced in the latter will then be continuously transmitted to the medium contacting the heat exchanger and the formation.

It will be apparent that the apparatus and the method discussed and disclosed in connection with FIGURE 7 can also be employed as a heater and/or as a wave generator in other environments than in a well bore in an oil bearing formation.

Still further, it is within the purview of this invention to provide two or more heaters of the character mentioned and to operate the same simultaneously and in various timed relations to produce various desired resultant waves and modifications of what may be termed the primary energy carrying wave, whether the latter is produced by the conduit 92 or by one of the electric heater means associated with or substituted for the members 104, 106.

Embodiment of FIGURE 9

The principles of this invention may be practiced by still another means and process as disclosed in FIGURE 9. Thus, the numeral 200 indicates a heat exchanger of any of the previously referred to types and which are capable of emitting continuous heat radiations. Associated in intimate heat-exchange relation with the heater 200, in any desired or conventional manner, is a chamber 202 which communicates with a pipe or conduit 204 by means of a non-return valve 206. This valve may be controllable in any of the manners set forth in connection with the embodiments of FIGURE 1 or 5.

An inlet conduit 208 communicates with the chamber 202 through a non-return valve 210 which likewise could be controllable in the aforesaid manners. Liquid from any suitable source is supplied by a conduit 212 through a valve chamber 214 having a non-return valve 216, which also could be operated in the above referred to manners to create an energy wave therein, into the conduit 204. The volume of the chamber 202 may be readily varied, in order to vary the operating characteristics of the apparatus, in any desired manner, such as that disclosed in FIGURE 10. A branch conduit 218, provided with a cut-off valve 220, supplies a portion of the liquid from the conduit 212 into the chamber 208.

When the control valve 220 is open, fluid from the conduit 212 enters both the valve chamber 214 and the valve chamber 208. From the former, it enters the conduit 204 for travel through the same in the direction by the arrow therein, while from the chamber 208 it enters the heating chamber 202. In this latter chamber, it comes into contact with the heater 200 and is heated thereby, as for example by flash heating causing an expansion of the liquid and an increase in the pressure within the chamber 202. This increased pressure closes the valve 210, but opens the valve 206 and is exerted against the fluid in the pipe 204, thus applying an impulse to the latter in the direction of the arrow. As the pressure escapes from the chamber 202, the pressure in the latter drops until the valve 206 again closes and the valve 210 opens, due to the constant pressure prevailing in the supply conduits 212 and 218, permitting the inlet of additional fluid and a recurrence of the expansion. Thus, the device automatically produces expansive pulsations which are applied to the liquid in the pipe 204.

The apparatus is thus capable of initiating and maintaining a pulsating wave in the fluid in the pipe 204. Alternatively, if the fluid in the pipe 24 is free to travel in the direction indicated by the arrow, the operation of the chamber 202 is that of a pump imparting a pulsating propulsive force to the fluid within the pipe. It should be noted that the fluid supplied to the pipe through the conduit 212 also is utilized to produce the propulsive force upon the fluid.

It is also within the comprehension of this invention to manipulate the valve 220 periodically in any desired manner to assist in the forming of an energy transmitting wave or a propulsive wave.

In this form of the invention, therefore, a constant source of heat is employed to produce intermittent pulsations which may be utilized either to produce a pulsating, energy-carrying wave or to propel fluid in a pipe.

It is believed evident that the principles of FIGURE 9 are applicable to and may be employed in conjunction with the various other modifications set forth herein.

Embodiment of FIGURE 10

In the embodiment of FIGURE 9, a pulsating force was applied by a constant source of heat to fluid in a pipe. In the arrangement of FIGURE 10, the same principle is utilized to apply a pulsating force to a fluid medium surrounding the heat impulse generator and from this medium to an oil bearing formation.

Thus, the numeral 221 designates an oil bearing formation in which is disposed a well bore 222. Indicated at 224 is a conduit by means of which a liquid pressure driving medium may be introduced into the well bore, as indicated by the arrows, the same emerging from the pipe 224 as by a non-return check valve assembly 226. If desired, this valve could be adjustably regulated and controlled as in FIGURES 1 and 5.

The lower end of the pipe 224 extends into the upper end of a cylindrical casing 228 which is provided with valved outlets as set forth hereinafter, and whose bottom rests upon the bottom of the well bore and may be secured thereto in any desired manner, not shown. Disposed within the cylinder 228 is a heat exchange device 230 which may be of any desired type such as those set forth herein and which may be capable of emitting a continuous heat flow of substantially uniform intensity.

At its upper end, the heat exchanger casing 228 is provided with a body having an outwardly flaring terminal portion 232 and which surrounds the lower end of the conduit 224, this body being connected by a conventional form of slip joint 234 with the upper end of casing 228 whereby the flared end may be raised or lowered with respect thereto. A frusto-conical baffle or deflector 236 is carried by the lower end of the conduit 224 and is received within the flared upper end 232. A plurality of non-return valves 238 are provided controlling the annular passageway between the flared end 232 and the conical deflector 236. These last mentioned valves may be independently or simultaneously controllable as in FIGURE 1 and/or FIGURE 5 to function individually or to function in unison as a combined wave generator.

There is thus provided a chamber 240 within the casing 228 of the heat exchanger, which chamber surrounds the heating device 230 and includes the space between the upper surface of the heating device and the deflector 236. This chamber may be varied in volume by raising or lowering the portion 232 as above mentioned. The above described principle of varying the volume of the pressure generating chamber may likewise be applied to the chamber 202 of FIGURE 9.

It is believed that the operation of this form of the invention, which is similar to that of the embodiment of FIGURE 9 will now be readily apparent. The expansion of the liquid or gas introduced by the pipe 224 into the chamber 240 causes a pressure impulse to pass through the valves 238 into the medium surrounding the heat exchange device, and this pressure is transmitted in the form of a pressure impulse or thrust into the formation 220. It is contemplated that by a series of pulsations of the fluid in the conduit 224, a series of discharges of fluid past the check valve 226 into the chamber 240 will be effected. These will result in a series of periodic pressure impulses produced by the continuous heat source 230 which impulses will pass through the valve assembly 226 and will apply a pulsating pressure to the fluid medium contacting the face of the formation in the well bore, thereby resulting in the generation of an energy-carrying wave in the medium which will be applied to the formation. Further the pressure of the fluid medium itself will be applied to the formation as a fluid pressure drive.

By varying the volume of the chamber 240, the characteristics including the amplitude of this wave may be regulated. The deflector 236 facilitates the application of the wave directly to the face of the formation, and therefore is to some extent at least directive of the wave.

Still further, however, it is possible to apply by any suitable means, not shown, additional periodic pulsations directly to the fluid medium in the bore 222 and thereby produce additional augmenting or modifying energy-transmitting waves therein. The heat generating device in turn can be used to augment the energy of any of these waves or to modify their characteristics in the manners previously set forth.

Also, the energy level of the fluid discharged by conduit 224 may be raised as by heating the fluid, before or after its entry into the well bore, so as to allow the heat means 230 to add energy into the energy wave, or to trigger the fluid into initiating energy impulses.

Embodiment of FIGURE 11

FIGURE 11 indicates a portion of the formation 490 having a well bore 492 therein in which is disposed a packer 494 of any suitable known character and which is engageable in tight fitting sealing engagement with the well bore. Depending from the packer is a casing or container 496, vertically slotted or apertured as at 498 in its side wall, for communication with the well bore. At its bottom, the casing is closed by a bottom wall 500.

A conduit 502 extends through the packer 494 whereby the packer and casing are secured to the conduit and are supported and vertically adjusted or positioned in the well bore by the same. The conduit also serves to introduce fluid into the well bore below the packer for applying a pressure drive and/or pulsating pressures to the adjacent formation.

The casing 496 is divided by a transverse partition 504 into an upper chamber 506, which is a mixing and distributing chamber as set forth hereinafter, and a lower combustion and heating chamber 508. A convexed or dish-shaped foraminous diffuser plate 510 is provided in the chamber 506 above the partition 504.

Air and gas supply lines 512 and 514 extend from the surface, down the well bore and through the packer 494, the plate 510 and the diaphragm 504 into the combustion chamber 508, terminating adjacent the bottom of the latter in non-return valves 516 and 518 respectively.

Ignition is effected and maintained in the combustion chamber 508 by any suitable known means, not shown. The combustion products are discharged from the combustion chamber by an exhaust pipe 520 having its adit adjacent the bottom wall 500 and being extended through and supported by the partition 504, with its out end disposed in the chamber 506 between the members 504 and 510 and being provided with a non-return check or outlet valve 522.

Adjacent or just below the packer, the conduit has a non-return check valve 524 and from thence extends downwardly through the combustion or heating chamber, having its lower end extended into the well bore below the bottom wall 500 and provided with a non-return check or discharge valve 526.

At a portion within the mixing chamber 506, and preferably in the upper portion thereof adjacent the valve 524, the conduit 502 has an outlet branch 528 provided wtih a non-return discharge valve 530.

This embodiment possesses a number of operations and functions. First, it functions as a heater, since the burning in the chamber 508 of the combustion components supplied by the pipes 512, 514 causes the casing 496 to radiate heat into the medium in the well bore below the packer surrounding the same and/or into the adjacent formation. Thus, the formation itself is directly heated at any predetermined location, beneficially effecting the recovery of oil therefrom according to known methods. It should be especially noted that the location of the heater within the well bore or formation insures that all heat generated will be effective to heat the formation.

Further, it is often found desirable in the treating of formations to facilitate the secondary recovery of oil or gas therefrom, to introduce carbon dioxide into the fluids of the pressure drive and/or the formation. This function is performed by this device since the carbon dioxide combustion products are exhausted from the combustion chamber 508 by the exhaust pipe 520 and discharge into the chamber 506 beneath the diffuser plate 510. Since this last chamber is filled with the fluid pressure medium, the exhaust gases bubble up through the same and are thoroughly intermingled therewith in the upper part of the chamber, being carried into the formation through the slots 498 with the fluid pressure medium as shown by the arrows.

Still further, the apparatus constitutes a preheater for the fluid medium, which is thus passed through the heating or combustion chamber 508 prior to the discharge into the well bore by the valved outlet 526. The heated fluid pressure medium is thereby rendered more effective as a pressurizing or drive medium and further heats the formation with beneficial results in the oil recovery therefrom.

Moreover, by appropriately proportioning or adjusting in any desired manner the closing pressures of the valves 524 and 526, whereby the closing pressure of valve 526 exceeds that of the valve 524, the portion of the conduit between these valves functions as a heat pump with a pulsating high pressure discharge of the pre-heated fluid. This principle of operation has been disclosed and claimed in my prior patents mentioned above. Briefly, the fluid between the valves is heated, causing the pressure thereof to increase until there is a discharge through the valve 526. Thus periodic, pulsating discharges are obtained, thereby applying pulsations or pulsating energy waves to the medium in the well bore and to the formation. These pulsating discharges will travel up the well bore about the casing 496, being further heated thereby, and being applied to the adjacent formation and also to some extent intermingling with the fluid in and emerging from the mixing chamber.

It will be further noted that the valve 530 may be controllable in any desired manner whereby when rendered operable it will provide a steady or a pulsing discharge into the mixing chamber, depending upon whether the pressure of the fluid medium supplied to the conduit 502 is steady or pulsating.

By the arrangement of the adit of the exhaust pipe 520 adjacent the bottom wall 500, any possibility of water leakage into the chamber 508 water logging the same is avoided, since the combustion pressure of the gases in the top of the chamber will form the level of such water below the inlet end of the exhaust pipe.

*Embodiment of FIGURE 13*

In FIGURE 13 is disclosed an arrangement which will facilitate and enable the application of heat selectively to the compression phase or to the rarefaction phase of an energy-carrying wave with precision and at various desired phase relationship. The principles of this embodiment may be applied to the preceding forms of the invention as a substitute therein, or as adjunct thereto, as disclosed in FIGURES 1–6, and 9; and also may be applied to the conduits 92 and 224 of FIGURES 7 and 10, respectively.

Indicated at 300 is any of the previously referred to conventional forms of generators of an energy carrying wave, which generator is in communication with a conduit section 302. Aligned with the conduit section 302 is a further conduit section 304 which may be considered as forming a continuation of the conduit section 302. A sleeve conduit 306 is slidably and telescopingly engaged with the adjacent ends of the conduit sections 302, 304 and is slidably adjustable longitudinally of the same. As illustrated, the sliding conduit 306 is disposed upon the exterior of the conduit sections 302, 304 but alternatively could be positioned within the same. It is, of course, understood that suitable packing means between the relative sliding conduits will be provided.

Mounted upon the adjustable conduit 306 is a heat exchange device 308 which may be of any of the previously described constructions of heat exchange devices whether heating or cooling. In addition, it may be also of the constructions disclosed and claimed in my co-pending applications, Serial Nos. 431,388; and, 434,299.

The arrangement is such that the heating device 308 with its associated sliding conduit section 306 may be adjusted longitudinally with respect to the sections 302, 304.

Shown in full lines at 310 is an energy carrying wave of a particular frequency and characteristic and which may be produced by the wave generator 300 or other source, while the dotted line 312 indicates another energy wave of a different frequency and/or characteristics and which may be produced by the generator 300 or other source.

The sliding arrangement illustrated in FIGURE 13 thus provides a means whereby the application of the heat impulses to the medium within the conduits may be adjusted to position the input or withdrawal of heat at the peak of the compression phases or of the rarefaction phases or at any other phase angle of any wave generated in the medium. Thus as shown in full lines, the heat exchanger is positioned so as to cause an input or withdrawal of heat from the compression phase of the wave 310; while in dotted lines is shown the position of the heat exchange device for introducing or abstracting heat from the compression phase of the wave 312.

Therefore, for any given wave, it is merely necessary to slidably adjust the members 306, 308 whereby the time of the heat input or heat withdrawal relative to the phase angle of the wave may be precisely and accurately controlled.

It will, of course, be understood that the heating device 308 may be employed to cause the heat input during a rarefaction phase of the wave, when it is desired to remove energy, in whole or in part, from the wave.

Still further, the device 308 may comprise a refrigerating or cooling device of the character previously illustrated at 13 in FIGURES 1 and 5, whereby heat may be withdrawn from either the compression phase or the rarefaction phase and at any desired phase angle of the wave, as desired, for the purposes of decreasing or increasing the energy content of the wave, or for effecting a phase displacement of the wave.

The arrangement of FIGURE 13 is deemed to be especially applicable to single conduits wherein both phases of an energy wave are present, and therefore it is necessary to accurately adjust and position the heat exchanger in a location at which the heat energy may be introduced into or withdrawn from the wave.

Embodiment of FIGURE 14

FIGURE 14 is a further diagrammatic arrangement and embodiment and which employs the principles of FIGURE 13, and which includes a conduit having the aligned sections 320, 322 with an intermediate section 324 positioned therebetween and spaced therefrom. This conduit is of course filled with a wave propagating medium of any desired character. Slidably and telescopically associated with the adjacent portions of the conduit sections 320, 324 and 326, 322, are a pair of slidable adjusting sections 326 and 328. One of these sections, such as the section 326 is provided with a heating device 330 which may be of any of the previously described or previously referred to types; while the other sliding section 328 is provided with a refrigerating or cooling heat exchange device 332 which may be of any suitable type such as the refrigerating coils 13 of FIGURES 1 and 5.

Associated with the heating device 330 is a refrigerating circuit which includes any known conventional pump or compressor unit 334 having a conduit 336 on its suction side and a delivery conduit 338 on its output side, this last-mentioned conduit communicating with the device 330. The intake conduit 336 is connected to the conduit 340, which in turn communicates with the device 330, there being a suitable manual control valve 342 disposed in this line. Thus, there is established a refrigerating circuit through the device 332. By reversing the flow through this refrigerating circuit, as indicated by the double headed arrows, the unit 330 can become a refrigerating or cooling means.

In this embodiment as so far described, it is to be understood that any desired means may be provided for causing the sliding movement of the units 326, 332 and 328, 330. Thus, each may be individually adjusted to cause the same to add heat at any desired phase timing with respect to the energy wave passing through the conduit sections. This construction enables both heat and cooling effects to be applied to the same conduit for increasing or decreasing the energy content of a wave therein.

It is further possible, in this form of the invention to cause the refrigerating circuit to include both the members 330 and 332. When the heater 330 is of a type in which a heating and a refrigerating fluid may be passed, the intake conduit 336 of the refrigerant compressor or pump 334 is connected thereto, and similarly, the conduit 340 is connected to the other side of the unit 330. In this arrangement the branch conduit including the manual control valve 342 is omitted, or is closed. Consequently, the refrigerating cycle will discharge heat into unit 330 and intake or receive heat in the unit 332, thereby respectively applying heat into the wave medium at one device and removing it from the wave medium at the other.

The joint use of the units 330, 332 serves to increase the temperature or energy difference between the two phases of an energy transmitting wave.

Also by applying the heating and cooling at various phase angles of the wave impulse and at relative positions to each other, the original wave form may be changed to one of controllable characteristics.

Embodiment of FIGURE 15

A still further embodiment is shown in FIGURE 15 which incorporates therein the principles set forth in connection with FIGURES 13 and 14. This arrangement is particularly adapted to the parallel branch conduit construction in the split phase embodiments of FIGURES 1 and 5, in which the energy wave is split as to its phase, the compression phase occurring in one branch conduit and the rarefaction phase in the other branch conduit.

Thus, there is disclosed a pair of conduits 350 and 352, it being understood that as in FIGURES 1 and 5, and in the manner diagrammatically indicated in FIGURE 12, that the compression phase of a wave is present in one of these conduits and the rarefaction phase in the other. As in FIGURE 13, each of the conduits 350, 352 is formed with two aligned sections, and these aligned sections are connected by a telescoping sleeve 354 for the conduit 350 and 356 for the conduit 352. Heat exchange devices 358 and 360 are respectively mounted upon the sleeves 354 and 356, these heat exchange devices being identical with the previously described units 332, and 330 respectively of FIGURE 14. There is also provided the compressor or pump member 362 having a delivery conduit 364 connected to the unit 358, a suction conduit 366 connected with the unit 360. A return conduit 368 connects the units 358 and 360.

In this form of the invention the refrigerating circuit causes an output of heat from one of the units and an intake of heat at the other unit, thereby selectively heating and refrigerating the selected phases of the energy wave maintained in the branch conduits 350 and 352.

It is believed that the operation of this embodiment of the invention will be readily apparent from a consideration of the preceding description in connection with FIGURES 1, 5 and 12, together with FIGURES 13 and 14, and accordingly a repetition of the operation is therefore believed to be unnecessary.

Embodiment of FIGURE 16

In FIGURES 16 and 17 there has been diagrammatically disclosed means and methods whereby energy may be transmitted by an energy-carrying wave and may be withdrawn therefrom in the form of mechanical energy as in FIGURE 16 or in the form of heat energy as in FIGURE 17.

Referring first to FIGURE 16, it will be observed that a mechanical wave generator 400 of any desired character, and which as illustrated includes a piston 402 reciprocated by a crank member 404, is in acoustical communication with a liquid or other energy wave propagating medium in a chamber 406. The latter communicates as by a conduit 408 with a chamber 410 to which is connected an energy receiving device 412. The latter, as illustrated, may also consist of a piston 414 connected with a crank member 416 to which rotation is to be imparted.

In a manner now generally well understood, the reciprocation of the piston 402 will produce an energy carrying wave 418 which travels from the medium in the chamber 406 to that in the chamber 410. As explained in detail in my prior patents mentioned above, there will be a region, indicated by the line 420 in the chamber 406 at which there is no further displacement of the medium, but the displacement energy of the same as caused by the piston 402 is converted into wave motion. This is known as the zero point of the medium. Similarly, in the energy receiving chamber 410 there is also a zero point 422 at which the wave energy is reconverted into mechanical energy causing a displacement of the medium, which displacement actuates the receiving piston 414.

By this arrangement, an energy carrying wave may be produced, energy may be supplied to this wave through the generator 400 and delivered to a target or receiving station at 412. Indicated at 424 is a heat exchange device which may be of any of the types above set forth and referred to hereinbefore in these application papers, and whereby energy is added to or subtracted from the energy wave as desired.

Embodiment of FIGURE 17

FIGURE 17 diagrammatically illustrates a system very similar to that of FIGURE 16 in that the wave generator 400 having a piston 402 and a crank driving means 404 is placed in acoustical connection with the chamber 406 which by means of a conduit 408 communicates with the receiving chamber 410.

Also as in the preceding form there is produced an energy bearing wave 418 which extends between the zero points 420 and 422 in the chambers 406 and 410, respectively. Still further, the heat exchanger 424 previously referred to is provided. However, in the receiving chamber 410, in place of the mechanical power take-off means previously described, there is provided merely an enclosing wall or surface 430.

In contact with and against the surface 430 there is disposed a gaseous medium, which is produced and maintained at the desired region in any desired manner, and which is of such a nature that a layer of gaseous material 432 is produced. For this purpose, a liquifiable gas may be employed which may alternate between its gaseous and its liquid phases during the pulsations or fluctuations of pressure applied to the same by the medium in which the energy-carrying wave is propagated. Thus, as the compression phase of the wave reaches the gaseous material, the same will be compressed into its liquid phase, but when the rarefaction phase of the wave is applied thereto, this material may convert into its gaseous phase.

In any event, the presence of a gas between the surface area 430 of the chamber 410 and the front or boundary of the wave propagating medium will result in the conversion of the wave energy in that medium into heat energy. This heat, of course, may be withdrawn from the wall of the chamber 410 for any desired purpose and in any desired manner. For example, the arrangement is particularly effective for applying heat into an oil bearing formation, since the various passages of the formation will function as the connecting conduit 408; and the contact of the medium against the oil deposits will result in the action set forth in connection with the members 410, 430 and 432.

As in the preceding form, the heat exchange device 424 may be utilized to either augment or decrease the energy content of the energy wave in the propagating medium.

In all of the forms of the invention hereinbefore disclosed, it should be noted that any heat energy not converted into wave energy will be applied to the medium and/or the formation in the form of sensible heat whereby beneficial results may be obtained.

Also, in all of the embodiments herein, it is possible to so vary the time at which the heat energy is introduced into or removed from a medium, that a variety of different results may be selectively obtained. Thus, heat input and/or withdrawal from the wave upon the compression and rarefaction phases may be so timed as to increase or decrease the energy content. Further, by appropriately varying the phase angle of the wave upon which the energy is input and/or withdrawn, the phase of the wave may be shifted to cause either an advance or lag in the wave crests. Thus, the compression phase may be displaced either forward or backward to prolong the same, thereby producing a hammer shock or greater peak in the wave, where this action is timed to lengthen the compression phase and increased wave impact or push results. Where the timing is such as to retard the wave, or deepen its rarefaction, a greatly reduced pressure impact or pull results.

In general, therefore, the embodiments disclosed present processes and means for continuously applying heat energy to an energy wave for controlling the characteristics of the same.

It is intended that the embodiment of FIGURE 11 may be utilized in the same manner as that of FIGURE 10 by merely providing an opening through the packer 494 to permit fluid flow therethrough. When so modified this construction as well as that of FIGURE 10 can be utilized as a fluid pump for discharging oil or fluid from a well bore, in the manner shown in FIGURE 9. In such uses, it will be observed that any heat not converted into energy will be beneficial in lowering the viscosity of the fluid in the surrounding formation.

In using the combustion heater of FIGURE 11 for formation heating in a well bore in the arrangements of FIGURE 1, the combination products passing up the well bore will function as a vapor lift, thereby improving production of the well.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An apparatus for applying energy to an energy carrying wave in a wave-propagating medium comprising a conduit for a wave-propagating medium and an energy wave generator coupled to said conduit, an induction coil surrounding said conduit, a timer for intermittently applying electrical energy to said coil, means connecting the timer and generator for causing the intermittent application of energy through the timer to the coil during the compression phase of the energy wave from the generator, an energy receiver in said medium for receiving energy from said coil, converting it into heat and imparting the heat to the medium.

2. The process of applying energy to a formation, comprising; placing a heat exchanger in heat exchange relation with a formation through a fluid medium, applying pressure to said formation through said fluid medium, producing pulsations in the pressure applied to the medium, causing intermittent operation of the heat exchanger in a fixed timed relation to the pulsations.

3. The process of claim 2 wherein the formation is an oil bearing formation.

4. A method comprising producing periodic energy wave impulses in a wave-transmitting medium, producing periodic electric impulses in timed fixed phase relation to the said producing of the periodic energy wave impulses, converting the electrical impulses into intermittently generated heat, introducing the intermittently generated heat ino the medium in said timed fixed phase relation to the periodic energy wave, and operatively connecting the medium to an oil bearing formation for transmitting and applying the energy wave thereto.

5. An apparatus for applying additional energy into a wave-transmitting medium comprising in combination means for producing periodic energy wave impulses in said medium, means for producing timed electric impulses in timed fixed phase relation to the periodic energy wave impulses, means for converting the electric impulses into intermittently generated heat, and introducing the intermittently generated heat into the medium, and means operatively connecting said apparatus to an oil bearing formation for transmitting and applying the energy wave thereto.

6. An apparatus for varying the energy content of an energy-carrying wave in a wave-propagating medium, comprising a conduit for a wave-propagating medium, an energy wave generator coupled to said conduit for producing an energy-carrying wave in the medium therein, a heat exchanger including a conductive foraminous body immersed in said medium in said conduit to convert electrical energy into sensible heat, an induction coil in operative relation to said foraminous body for intermittently supplying electrical energy thereto in synchronization with the pulsations of the energy-carrying wave whereby to effect a change in the energy content of said wave.

7. The combination of claim 6 wherein said induction coil surrounds said body.

8. A process for applying energy to an energy-carrying wave in a wave-propagating medium comprising surrounding the medium with an induction coil, providing a receiver in said medium for transmitting energy from said induction coil into heat energy into said medium, producing energy waves in said medium, intermittently supplying energy to said induction coil in timed relation to the compression phases of the energy waves in said medium, and operatively connecting the medium to an oil bearing formation for applying energy waves and heat energy thereto.

9. The process comprising operating a wave generator operatively coupled to a wave-propagating medium and thereby producing an energy transmitting wave in a wave-propagating medium, operating an electrical impulse generator in synchronization with said wave generator whereby to produce electrical impulses at a frequency which is the same or a multiple of the frequency of the impulses produced by the wave generator, converting said electrical impulses into intermittent heat impulses in the wave-propagating medium, varying the time of the generation of the intermittent heat impulses relative to the phase of the energy wave, and operatively connecting the medium to an oil bearing formation for applying the energy waves and heat impulses thereto.

References Cited in the file of this patent
UNITED STATES PATENTS

| | | |
|---|---|---|
| Re. 23,381 | Bodine | June 26, 1951 |
| 2,344,754 | Vang | Mar. 21, 1944 |
| 2,549,464 | Hartley | Apr. 17, 1951 |
| 2,581,902 | Bodine | Jan. 8, 1952 |
| 2,667,932 | Bodine | Feb. 2, 1954 |
| 2,670,801 | Sherborne | Mar. 2, 1954 |
| 2,796,129 | Brandon | June 18, 1957 |
| 2,796,735 | Bodine | June 25, 1957 |
| 2,836,033 | Marrison | May 27, 1958 |
| 2,866,509 | Brandon | Dec. 30, 1958 |